(12) United States Patent
Ghanaie-Sichanie et al.

(10) Patent No.: US 7,523,461 B2
(45) Date of Patent: Apr. 21, 2009

(54) MODIFICATION OF LOGIC IN AN APPLICATION

(75) Inventors: Arash Ghanaie-Sichanie, Bothell, WA (US); Alexander Tkatch, Sammamish, WA (US); Kevin M. Whittenberger, Woodinville, WA (US); Michael J. Ott, Redmond, WA (US); Michaeljon Miller, Bellevue, WA (US); Xinguang Albert Chen, Redmond, WA (US); Youg Lu, Sammamish, WA (US); Mohammad Mushtaque Silat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 11/290,157

(22) Filed: Nov. 30, 2005

(65) Prior Publication Data

US 2007/0005642 A1    Jan. 4, 2007

Related U.S. Application Data

(60) Provisional application No. 60/696,171, filed on Jul. 1, 2005.

(51) Int. Cl.
*G06F 9/44* (2006.01)
(52) U.S. Cl. .................. 719/316; 709/318; 707/103 R
(58) Field of Classification Search ................. 719/320, 719/310, 313, 315, 316, 318; 707/100, 101, 707/102, 103 R; 709/203, 246
See application file for complete search history.

(56) References Cited

U.S. PATENT DOCUMENTS

| 2004/0111389 A1* | 6/2004 | Pudipeddi et al. ............... 707/1 |
| 2004/0201600 A1* | 10/2004 | Kakivaya et al. ............ 345/700 |
| 2005/0086360 A1* | 4/2005 | Mamou et al. .............. 709/232 |

* cited by examiner

*Primary Examiner*—Van H Nguyen
(74) *Attorney, Agent, or Firm*—Marshall, Gerstein & Borun LLP

(57) ABSTRACT

An extensible architecture that allows the users to extend, change or replace the existing business logic of the business application is disclosed.

15 Claims, 4 Drawing Sheets

MODIFICATION OF LOGIC IN AN APPLICATION

This is a non-provisional of U.S. Provisional Application Ser. No. 60/696,171, filed Jul. 1, 2005, the entire disclosure of which is incorporated herein by reference.

BACKGROUND

One of the core features and highly desired functionalities of any value-add business application such as a customer relationship management ("CRM") system is the ease and cost of adapting to many existing business requirements. Ideally, an application should expose, manage and execute business logic in a flexible and extensible way. Business logic enables commercial enterprises to model and execute their processes in order to simplify and consolidate their functions. It empowers users to work more effectively and provides the best value out of their business application. Nevertheless, as every business has different and specific requirements, a desired business application should provide out-of-the-box business logic as well as a rich extensibility model that allows new business logic and data to be seamlessly integrated with the application. A typical business application provides application programming interfaces ("APIs") to enable the users to access the application data and logic. Most of these application APIs have the business logic hard coded in their architecture and execution path and offer little ability to adopt and incorporate new/modified business logic/data to the users of the application. These APIs locate and execute the logic in a non extensible and rigid way and will not allow any dynamical change to the APIs to allow custom data and processes exposure and management. As the business logic is not extensible, the only way to include new logic or modify existing logic is to change the application source code and recompile the application which is not desirable and is inefficient.

SUMMARY

An extensible architecture that allows users to extend, change or replace existing business logic of a business application which allows comprehensive customization of the business logic and significantly improves the usability of the application is disclosed. The design may: 1) allow the business data and process customization to be added to the system and be accessed programmatically by dynamically generating the service descriptions that include any newly added customization and providing an extended execution path for the logic/data to be accesses/executed without the need for recompiling the application source code; and 2) allow the users to integrate their own business logic and code into the API calls that are made to the application in order to extend or modify the out-of-the box business logic and the system behavior.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
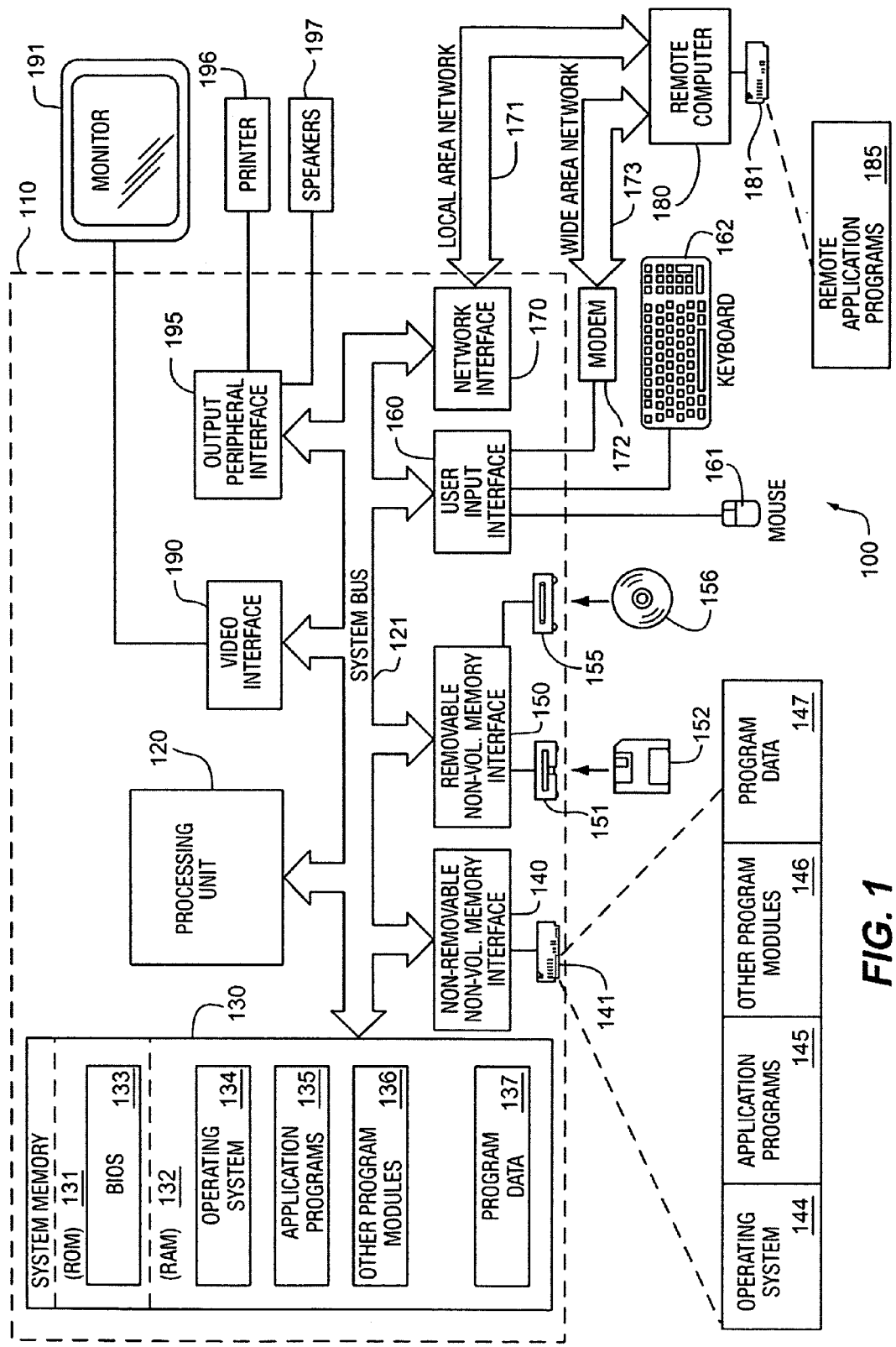
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
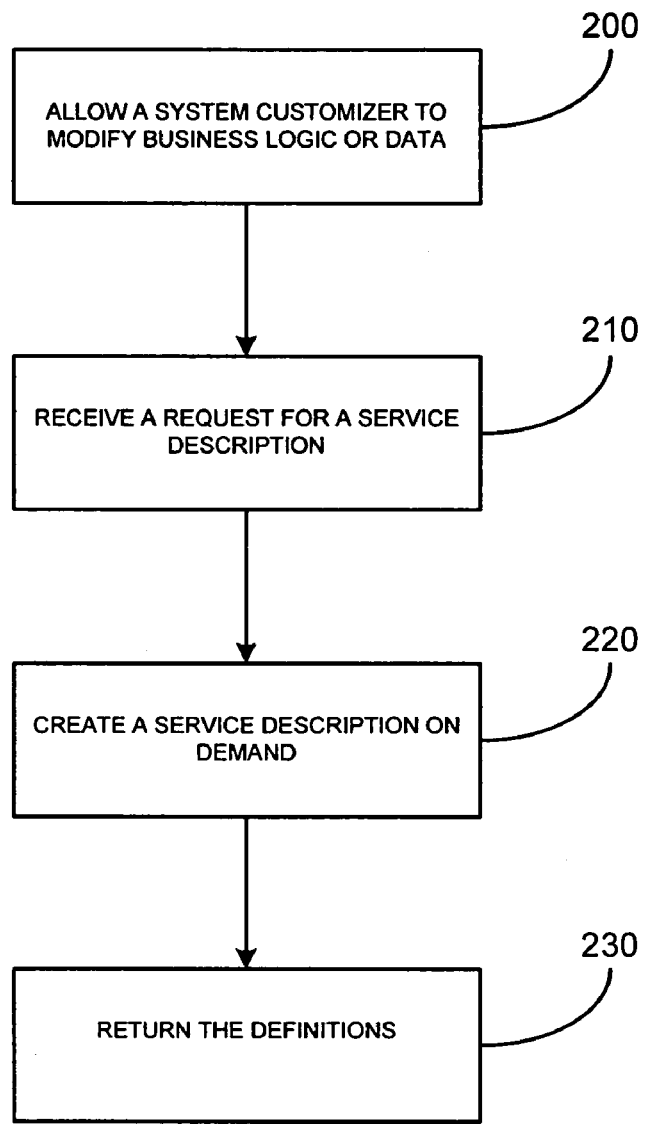
FIG. 2 is flowchart of a method that may be in accordance with the claims.

FIG. 2 may illustrate a method of modifying business logic in a business application such as a customer relationship management ("CRM") system in accordance with the claims. A pluggable architecture may allow users to define new service providers and messages. At block 200, the method may allow a system customizer 380 (FIG. 3) to perform several tasks including defining new customer entities, modifying existing customer entities, defining new messages, adding new service providers and plugging in new code to be executed as part of a web service call. At block 210, the method may receive a request for a service description. A user of a application may need further information to modify the application.

Figure 3:
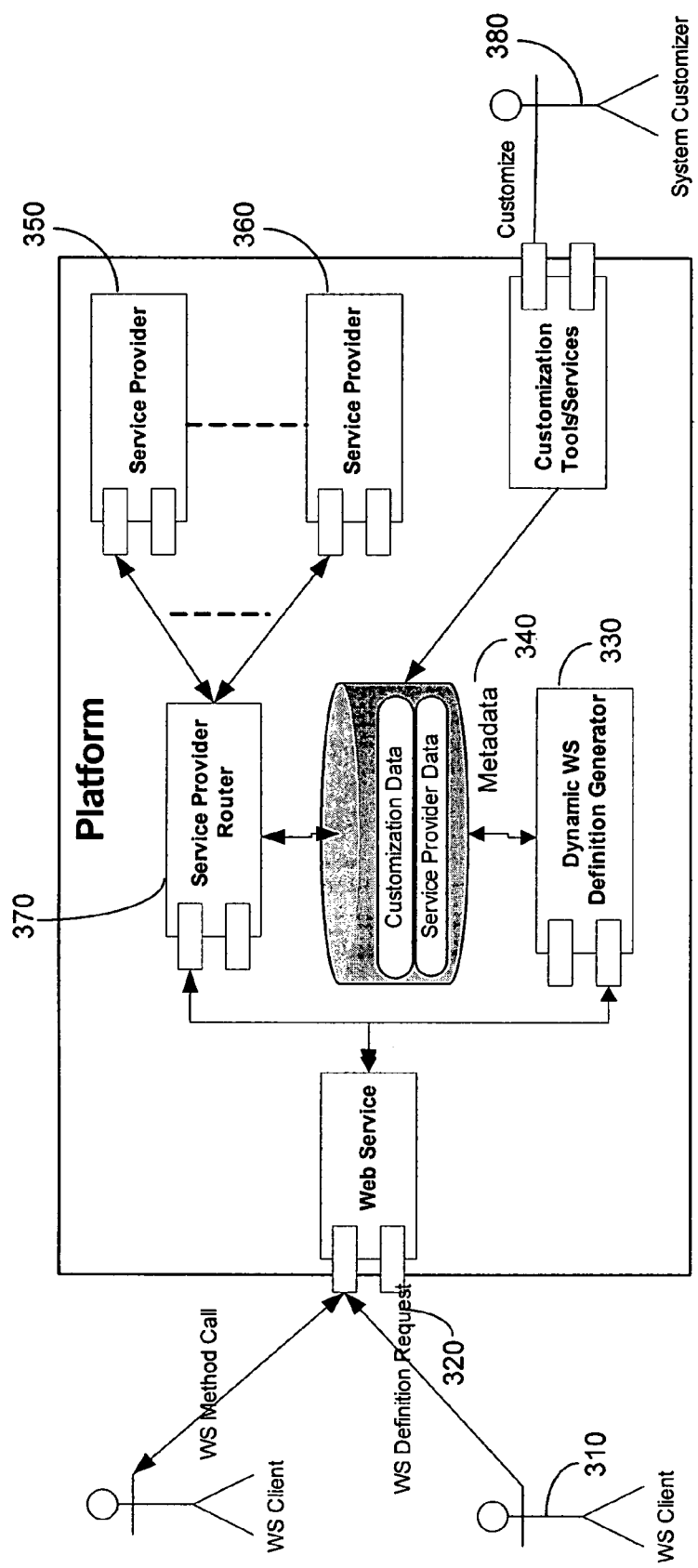
FIG. 3 is an illustration of a CRM platform that may implement the method.

At block 220, the method may create a service description on demand by referencing metadata about the service description wherein the metadata includes full type descriptions for as-shipped and custom business entities. Referring to FIG. 3, a user of an application, such as a customer relationship management ("CRM") application 310, that plans to make modifications may need type definition and class information for the new customization so he/she can effectively program against the new types. A Web Service Description Language (WSDL) may provide a globally acceptable format to define the service capabilities and types. A user may make a request to the application, possibly through a web service and ask for the latest WSDL file. When a request is received by the application platform, the Dynamic Web Service (WS) generator 330 may use the metadata 340 information to generate all the types that are required by a user to effectively program against CRM Server in strongly typed format. The generator may use the metadata to generate schemas that are then included in the generated WSDL that is returned to the requester. It should be noted FIG. 3 references a CRM application, but the method may be applied to any business application.

As an example, if a user adds a new custom entity called BankAccount, a new schema for this is entity may be generated that defines the BankAccount type and all members (Attributes) and their types. This schema may be included in the requested WSDL which allows the clients to generate classes on the client side and enables effective coding. As the generated schema is fully typed, the clients may be able to define strongly typed classes for the programmer to use.

Referring again to FIG. 2, at block 230, the method may return the definitions wherein the definitions are used to request functionality. When a web method call is made by the user of API, a message may be sent by the API user to the application platform. Such a message may need to be handled by different service providers 350, 360 based on the type of the target business entity that the web method is called on. This may allow polymorphic interfaces on the web service interface which may significantly improve the productivity of the user when working with multiple data types (Business Entities, for example) that exist in a business application. A service provider router 370 gets the web method call and based on the type information and description of available service providers that are registered in the metadata, may route the execution of the method to the appropriate service provider 350, 360.

A service provider may include specialized operations as well as commonly shared operations across all the service providers. In order for a service provider to expose a common operation that is also shared by other service providers, the provider may simply uses multiple interface inheritance to include the name of the supported interfaces in a class declaration. In the below example, the BankAccountServiceProvider uses the default definition of ICreatable, IUpdatable, IDeletable, IRetrievable, IMergable, IOwned and IStateful interfaces which means the provider supports these corresponding operations. The service provider may also support specialize operations. In this example, the CustomServiceProvider is an abstract interface which is implemented in the BankAccountServiceProvider to provide specialized operation and business logic. The following may be a code example:

public class BankAccountServiceProvider: CustomServiceProvider, ICreatable, IUpdatable, IDeletable, IRetrievable, IMergable, IOwned, IStateful { }

A user may need to register the service provider with the metadata 340 and modify the service description to map specific messages to the service provider 350, 360. Then new messages may be defined that are inherited from the base message classes allowing the same interfaces to be used for the new messages. As all the routing and service description are driven and generate dynamically from the metadata 340, extending this model is simplified and does not need a recompile of the whole application.

Figure 4:
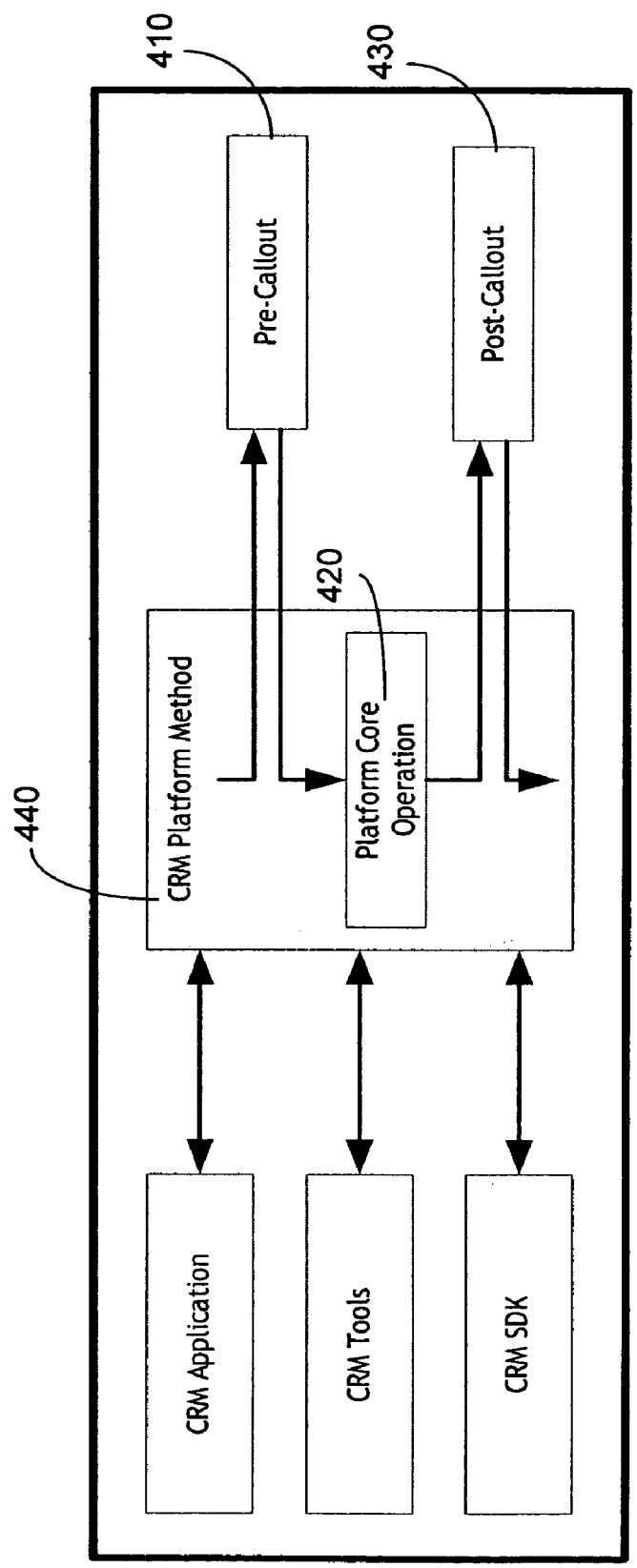
FIG. 4 is an illustration of a flow diagram of a pre-callout and post-callout routine that may be in accordance with the claims.

One way to allow a user to modify an existing operation of the application to add or modify existing business logic and processes may be through a callout mechanism that is included in the application web service. The callout model may expose a number of events to which a user code can subscribe. After a user is subscribed to an event, when the event is invoked, the plug-in code that is provided by the user may be executed as part of the web service call. This architecture may add yet another very powerful extensibility point to the application. The events may be categorized into Pre and Post events. Referring to FIG. 4, pre-callout events 410 may allow execution of custom code before an application platform operation is executed 420 and the post-callout events 430 may allow execution of the code after the application platform operation is executed 420. Again, FIG. 4 uses a CRM application as an example, but this method may be applied to any business application.

Each application operation that supports the pre and/or post callout may provide an interface that can be overridden by user code. The application platform 440 may call into these methods at the operation execution time. Contextual information that may be provided inside the callout function 410, 430 may be used for additional business logic processing or simply to modify the data that is passed into the application platform. Of course, there may be other ways to modify an existing operation of the application to add or modify existing business logic and processes. The following code may illustrate some methods that may be overridden by user for pre-callout (PreCRMOperationEvent (e.g. PreCreateEvent)) or post-callout (PostCRMOperationEvent (e.g. PostCreateEvent)).

```
public virtual PreOperationReturnValue PreCRMOperationEvent(
        CalloutUserContext       userContext,
        CalloutEntityContext     businessEntityContext,
        ref string               businessEntityXml,
        ref string               errorMessage
        )
{
        return PreCRMOperationReturnValue.Continue;
}
public virtual void PostCRMOperationEvent(
        CalloutUserContext       userContext,
        CalloutEntityContext     entityContext,
        string                   preImageEntityXml,
        string                   postImageEntityXml
        )
{
}
```

While in the PreCRMOperationEvent process, a user may invoke different actions in respect to the CRM Server and continuation of method execution.

Continue action: The callout has completed successfully and the CRM Server should continue with the execution of the method.

Stop action: The pre callout has completed successfully and no further processing for the method should be done.

Abort action: The callout component encountered an error and the platform should abort the method call returning an error to the method caller.

Rich messages may be sent to the callout process including method execution context, the business entity context and calling user context. A user may modify and intervene with this data before it is sent to the CRM Server. This is an approach that allows data and processes to be modified on the fly through the callout extension to provide a much richer and closer extensibility with the CRM application. An error message may also be returned to the caller in order to enable building business logic based on returned error messages.

After modifications have been made, the metadata may store the modifications so every time a system customizer adds any of these customizations, the metadata may be updated with the description of such customization.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method of modifying business logic in a business application comprising:
   receiving a request for a service description;
   creating the service description on demand by referencing metadata about the service description wherein the metadata includes full type descriptions for a custom business entity and an existing business entity;
   returning the service description wherein the service description is configured to be used to request user created functionality;
   allowing the service description to be used to perform the user created functionality including at least one of:
      defining a new custom business entity with new user created information;
      modifying the existing business entity with new user created information;
      defining a new message configured for use with the service description; or
      plugging in new code to be executed as part of a web service call associated with the service description;
   executing a dynamic service generator that generates the service description using the metadata to generate types and schemas required for the service description;
   modifying or adding to existing business logic or processes by using a callout mechanism that exposes a number of events to which a user code can subscribe;
   allowing a user to subscribe to an event; and
   executing plug-in code provided by the user as part of the web service call when the event is invoked.

2. The method of claim 1, wherein the metadata stores the modifications.

3. The method of claim 1, further comprising handling the request through a service provider router that routes the request to a different service provider based on a type of a target business entity of the request.

4. The method of claim 3, further comprising receiving the web service call through the service provider router and, based on the type information and description of available service providers that are registered in the metadata, routing the execution of the method to the appropriate service provider.

5. The method of claim 1, further comprising using multiple interface inheritance to expose a common operation across multiple service providers to include names of supported interfaces in a class declaration.

6. The method of claim 1, further comprising defining new service providers and messages by registering the service provider with the metadata and modifying the service description to map specific messages to the service provider.

7. The method of claim 1, wherein user plug in code comprises pre-callout events wherein the pre-callout events allow execution of custom user code before an application operation.

8. The method of claim 1, wherein user plug in code comprises post-callout events wherein the post-callout events allow execution of custom user code after an application operation.

9. The method of claim 1, wherein the plug in user code can modify data passed to the application platform.

10. The method of claim 1, wherein an error message is returned to the requestor in order to enable building business logic based on returned error messages.

11. A computer storage medium storing computer executable instructions executed by a processor for modifying business logic in a business application, the computer executable instructions for:
   receiving a request for a service description;
   creating the service description on demand by referencing metadata about the service description wherein the metadata includes full type descriptions for a custom business entity and an existing business entity;
   returning the service description wherein the service description is configured to be used to request user created functionality;
   allowing the service description to be used to perform the user created functionality including at least one of:
      defining a new custom business entity with new user created information;
      modifying the existing business entity with new user created information;
      defining a new message configured for use with the service description; or
      plugging in new code to be executed as part of a web service call associated with the service description;
   executing a dynamic service generator that generates the service description using the metadata to generate types and schemas required for the service description;
   modifying or adding to existing business logic or processes by using a callout mechanism that exposes a number of events to which a user code can subscribe;

allowing a user to subscribe to an event; and executing plug-in code provided by the user as part of the web service call when the event is invoked.

12. The computer storage medium of claim 11, further comprising computer code for handling the request through a service provider router that routes the request to different service providers based on at least one of:

a type of a target business entity of the request; or the type information and description of available service providers that are registered in the metadata.

13. The computer storage medium of claim 11, further comprising computer code for using multiple interface inheritance to expose a common operation across multiple service providers to include names of supported interfaces in a class declaration.

14. The computer storage medium of claim 11, further comprising computer code for defining new service providers and messages by registering the service provider with the metadata and modifying the service description to map specific messages to the service provider.

15. A computer system comprising a processor adapted to execute computer executable code, a computer storage medium in communication with the processor and adapted to store computer executable code and an input-output device, the computer storage medium storing computer code for:

receiving a request for a service description;

creating the service description on demand by referencing metadata about the service description wherein the metadata includes full type descriptions for a custom business entity and an existing business entity;

returning the service description wherein the service description is configured to be used to request user created functionality;

allowing the service description to be used to perform the user created functionality including at least one of:

defining a new custom business entity with new user created information;

modifying an existing business entity with new user created information;

defining a new message configured for use with the service description; or plugging in new code to be executed as part of a web service call associated with the service description;

executing a dynamic service generator that generates the service description using the metadata to generate types and schemas required for the service description;

allowing a user to subscribe to an event; and executing plug-in code provided by the user as part of the web service call when the event is invoked wherein the user plug in code comprises one of:

pre-callout events wherein the pre-callout events allow execution of custom user code before an application operation; and post-callout events wherein the post-callout events allow execution of custom user code after an application operation.

* * * * *